Patented Sept. 29, 1931

1,825,300

UNITED STATES PATENT OFFICE

WALTER S. BAYLIS, OF LOS ANGELES, CALIFORNIA, ASSIGNOR, BY MESNE ASSIGNMENTS, TO FILTROL COMPANY OF CALIFORNIA, OF LOS ANGELES, CALIFORNIA, A CORPORATION OF CALIFORNIA

PROCESS OF DECOLORIZING OILS BY FILTRATION THROUGH PAPER

No Drawing. Application filed April 24, 1928. Serial No. 272,572.

This invention relates to a filtering or so-called "blotting" paper capable of filtering oils, gasoline or other liquids and decolorizing them in one operation.

More particularly, it relates to a paper of this type containing a proportion of an acid-activated clay containing a small proportion of free acid.

It also relates to a process of using such paper to filter and decolorize gasoline.

The objects of my invention are to provide a rapidly filtering paper of extraordinary decolorizing efficiency and also to provide a method of filtering gasoline therethrough so as to take out solid matter and coloring matter efficiently by providing an acid condition during the filtration.

In order to accomplish these results, I incorporate into blotting or filtering paper at the time of its manufacture from 10% to 25% of its finished weight of an acid-activated clay containing a small amount of free acid. I prefer to use a special kind of clay known as "Filtrol". The special kind referred to is incompletely neutralized in manufacture so that it contains, uniformly distributed in it, from 0.15% to 0.50% of free $H_2SO_4$.

This acid is held in a more or less adsorbed or absorbed condition so that it is not readily washed out with water. This property makes it possible to add the acid clay to paper pulp while manufacturing the paper with the assurance that most of the acidity of the clay will be retained in the finished paper. Due to its absorbed condition, the free acid has little or no tendency to deteriorate the paper on storage.

In the preferred practice of my invention, I add Filtrol equal to 25% of the weight of the finished paper to the paper pulp. The Filtrol contains about 0.30% free $H_2SO_4$ and will give, in the paper, an acidity of the clay of about 0.25%.

In making the paper, an extra close filtering blanket should be used on the paper machine to prevent filtering through of the clay: the amount of vacuum should be reduced and the machine run at a slower speed than usual.

In using the paper, it is preferably used in the conventional filter press in place of the usual cloth. In may be used with the cloth behind it, to confer additional strength. Alternate sheets of paper containing clay and paper containing no clay may be used so that any clay washed from the clay containing sheets during filtration will be caught on the sheets containing no clay.

When gasoline is the liquid to be filtered through the paper, a "contact" filtration is preferably performed on the gasoline first. That is, it is agitated in a tank with a suitable amount of decolorizing clay or other adsorbent. It may be given the usual sulphuric acid treatment before being contacted, and the acid separated, or not as preferred.

I may filter the gasoline through the paper in either a neutral or acid condition. To filter while acid, I add not over 1% by weight of 66° Bé. $H_2SO_4$ to the gasoline, a little at a time, agitating well while doing so, and then pass it through the decolorizing paper. In the case of such acid treatment, a contact filtration may be dispensed with before the liquid is passed through the decolorizing paper. The clay in the paper will adsorb more acid, rendering the filtrate substantially neutral.

I claim as my invention:

1. The method of decolorizing a liquid containing suspended colloidal coloring matter which comprises passing the said liquid through a filtering paper containing acid-activated clay which contains free acid.

2. A method according to claim 1 in which the liquid to be decolorized is gasoline.

3. The method of filtering and decolorizing gasoline which comprises, agitating it with a decolorizing agent, separating the agent and liquid and then passing the liquid through filtering paper containing acid-activated clay having a free acid content.

4. The method of filtering and decolorizing gasoline which comprises, adding slowly and with agitation, strong sulphuric acid in amount not exceeding 1% by weight to the gasoline and then filtering the mixture through filtering paper containing acid-activated clay having a free sulphuric acid content.

5. A process according to claim 4 in which the clay content of the paper ranges from 10% to 25% by weight.

6. A process according to claim 4 in which the acid content of the clay in the paper lies between 0.10% and 0.50% by weight.

In testimony whereof, I have hereunto set my hand at Los Angeles, California, this 19th day of April, 1928.

WALTER S. BAYLIS.